United States Patent
Farkh et al.

(10) Patent No.: US 8,393,305 B2
(45) Date of Patent: Mar. 12, 2013

(54) CONTROL VALVE WITH SEALING SEGMENT FOR FLUID CIRCULATION CIRCUIT

(75) Inventors: Alain Farkh, Montfort l'Amaury (FR); Frédéric Vacca, Behoust (FR); Jean-Bernard Dumetz, Versailles (FR)

(73) Assignee: Valeo Systemes Thermiques S.A.S., Le Mesnil Saint Denis (FR)

( * ) Notice: Subject to any disclaimer, the term of this patent is extended or adjusted under 35 U.S.C. 154(b) by 1671 days.

(21) Appl. No.: 11/596,950

(22) PCT Filed: May 17, 2005

(86) PCT No.: PCT/FR2005/001222
§ 371 (c)(1),
(2), (4) Date: Jun. 12, 2007

(87) PCT Pub. No.: WO2005/124205
PCT Pub. Date: Dec. 29, 2005

(65) Prior Publication Data
US 2007/0251582 A1    Nov. 1, 2007

(30) Foreign Application Priority Data

May 17, 2004    (FR) ..................................... 04 05345

(51) Int. Cl.
*F01P 7/14*    (2006.01)
(52) U.S. Cl. ................... 123/41.08; 123/41.31; 251/160
(58) Field of Classification Search .............. 123/41.08, 123/41.01, 41.06, 41.09, 41.31, 41.44, 41.4, 123/188.12, 188.13, 190.1, 190.12, 190.17; 251/163, 283, 286, 314, 311, 160, 167, 180, 251/188, 192, 206–209, 304, 309
See application file for complete search history.

(56) References Cited

U.S. PATENT DOCUMENTS

| | | | |
|---|---|---|---|
| 2,346,052 A * | 4/1944 | Seamark | 251/163 |
| 3,489,389 A | 1/1970 | Kaatz | |
| 3,991,975 A * | 11/1976 | Sibrava | 251/317 |
| 5,706,851 A * | 1/1998 | Lopez-Gomez et al. | 137/246.22 |
| 5,763,974 A * | 6/1998 | Vacca | 310/152 |
| 6,315,267 B1 * | 11/2001 | Zajac et al. | 251/69 |
| 7,302,919 B2 * | 12/2007 | Vacca et al. | 123/41.1 |

FOREIGN PATENT DOCUMENTS

FR    2 827 357    1/2003

\* cited by examiner

*Primary Examiner* — Noah Kamen
*Assistant Examiner* — Hung Q Nguyen
(74) *Attorney, Agent, or Firm* — Howard & Howard Attorneys PLLC

(57) ABSTRACT

A control valve (10) for a fluid circulation circuit comprises a valve body (12) having a bottom wall into which an axial orifice emerges and a side wall (16) into which side orifices (20, 22, 24) emerge, the valve body delimiting a housing of revolution for a regulating member (26) capable of rotating about a rotation axis XX and of taking various angular positions to control the distribution of the fluid through the orifices. The regulating member (26) is surrounded by a sealing segment (42) in the shape of an open ring and elastic means are provided to separate two ends (44, 46) of the sealing segment in order to deform it radially outward and thus ensure that the sealing segment is pressed against the valve body housing. Application particularly to the fluid circuit of motor vehicles.

15 Claims, 6 Drawing Sheets

CONTROL VALVE WITH SEALING SEGMENT FOR FLUID CIRCULATION CIRCUIT

The invention relates to a control valve for a fluid circulation circuit, in particular for a motor vehicle internal combustion engine cooling circuit.

More particularly, the invention relates to a control valve of the type comprising a valve body having, in particular, a bottom wall into which an axial orifice emerges and a side wall into which at least two side orifices emerge, the valve body delimiting a housing of revolution for a regulating member capable of rotating about a rotation axis and of taking various angular positions to control the distribution of the fluid through the orifices, and in which the regulating member is surrounded by a sealing segment in the shape of an open ring, that is fixedly attached in rotation to the regulating member.

According to the French patent application No. 01 09218, filed on 11 Jul. 2001, a control valve of this type is already known that may also be qualified as a "rotary valve" because the regulating member rotates about an axis of rotation and is received in a housing of revolution arranged in the valve body.

In this known control valve, the axial orifice usually forms an inlet way for the fluid, while the side orifices form outlet ways for the fluid, the distribution of the fluid through the outlet ways being controlled according to the angular position taken by the regulating member.

In a preferred application of such a control valve, the side wall comprises three side orifices which form outlet ways and which communicate respectively with three branches that the fluid circulation circuit comprises. This known control valve finds a particular application in the cooling circuits of motor vehicle internal combustion engines. In this case, the axial orifice, forming a fluid inlet, is connected to an intake of cooling fluid originating from the internal combustion engine, while the three side orifices, forming fluid outlets, are connected respectively to three branches of the circuit. This circuit comprises a first branch which contains a cooling radiator of the engine, a second branch which forms a cooling radiator bypass and a third branch which contains an air heater for the heating of the passenger compartment.

The control valve described in French patent application 01 09218 comprises a regulating member of generally cylindrical shape which is surrounded by a sealing segment in the shape of an open ring and which is fixedly attached in rotation to the regulating member to prevent any accidental leakage of fluid toward a side orifice, defining a valve outlet.

In the aforementioned publication, the sealing segment is arranged with a slight clearance around the regulating member, which allows the sealing segment to be pressed internally against the side wall of the valve body to ensure a seal under the action of the pressure of the fluid.

However, it has been observed that this sealing segment performed its sealing function perfectly when the difference in pressure and/or flow of the fluid entering the valve body was sufficiently high.

On the other hand, when the pressure and/or the flow fell below a certain value, the seal was not perfect and leaks of fluid could occur.

Such a valve is designed to operate with wide ranges of pressure and/or flow difference and the seal must be able to be ensured in any circumstance.

The main object of the invention is to provide a control valve of the type defined in the introduction, in which the sealing segment is arranged to ensure a seal in any circumstance, over an extensive range of fluid pressure and/or flow, including in situations in which this pressure and/or this flow reach a very low value.

The invention also aims to procure such a control valve which is more particularly suitable for a cooling circuit of a motor vehicle internal combustion engine.

For this purpose, the invention proposes a control valve of the type defined in the introduction, in which elastic means are provided to separate two ends of the sealing segment and to deform it radially outward and thus ensure that the sealing segment is pressed against the valve body housing.

Thanks to these elastic means, the sealing segment is permanently acted upon in the radial direction, outward, which ensures a tight contact of this segment against the housing of the valve body, thus ensuring a seal with the side orifices and preventing any substantial leakage of the fluid.

These elastic means are appropriately chosen so that this radial deformation does not generate too high a flattening pressure that would impair good operation of the control valve.

Specifically, it is essential that the sealing segment generates the minimum of friction with the inner wall of the valve body in order to limit the power of the actuator, usually of the electric type, which rotates the regulating member about its axis.

In a first general embodiment of the invention, the elastic means comprise at least one spring member interposed between the ends of the sealing segment to separate them from one another.

In a first variant, the spring member is a retaining ring formed of a spring-effect material. This retaining ring may, for example, comprise a U-shaped elbow connecting two branches arranged to be pressed against the ends of the sealing segment.

In a second variant embodiment, the spring member is a metal sheet having two opposite sides arranged to be pressed against the ends of the sealing segment.

It is advantageous that the two ends of the sealing segment are made in the form of two folded edges delimiting respectively two parallel grooves facing one another for the receipt of the spring member.

In another embodiment, the elastic means comprise at least one spring member made in the form of a radial expansion ring interposed between the regulating member and the sealing segment.

In a preferred embodiment, the valve comprises two radial expansion rings made in the form of a retaining ring made of a spring material and each inserted into a peripheral groove of the regulating member.

In a second general embodiment of the invention, the elastic means comprise a deformation of the sealing segment so that it has an external diameter that is greater than the internal diameter of the housing and thus allows the sealing segment to be mounted under pre-stress in the housing.

This segment is advantageously made of a spring-effect material, in particular of spring steel. To reduce the friction, it is preferable that this sealing segment is furnished externally with a facing made of a low friction coefficient material. The sealing segment may be furnished with a key coat to make the keying of the facing easier.

It is also advantageous that this sealing segment comprises a smooth outer surface into which a multiplicity of evenly distributed blind holes emerges, to reduce the contact surface between the sealing segment and the side wall.

In a preferred embodiment, the axial orifice forms a fluid inlet, while the side orifices form fluid outlets.

In another aspect, the invention relates to a fluid circulation circuit comprising a control valve, as previously defined, whose axial orifice is connected to a source of fluid and whose side orifices are connected respectively to branches of the circuit.

In a preferred application, this circuit is made in the form of a cooling circuit of a motor vehicle internal combustion engine, traversed by a cooling fluid under the action of a circulation pump, and the control valve is a three-way valve whose axial orifice is connected to an intake of cooling fluid originating from the engine and whose three side orifices are connected respectively to a first branch of the circuit which contains a cooling radiator of the engine, a second branch of the circuit that forms a bypass of the cooling radiator and a third branch of the circuit that contains an air heater for the heating of a passenger compartment.

In the following description, made only as an example, reference is made to the appended drawings in which.

Figure 1:
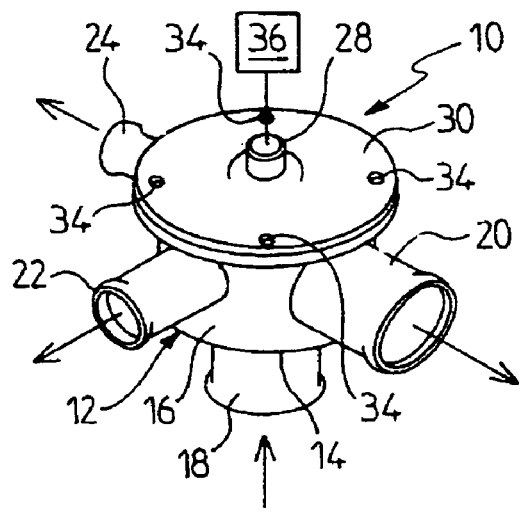
FIG. 1 is a view in perspective of a control valve, of the three-way type, according to the invention.
Figure 2:
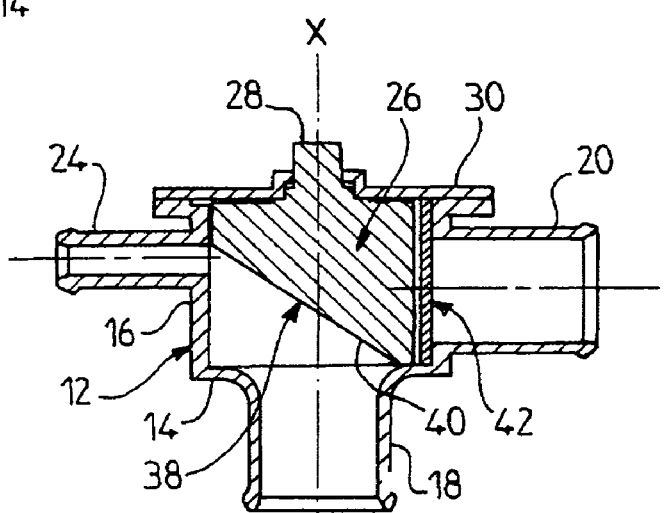
FIG. 2 is a view in section of the control valve of FIG. 1, the sectional plane passing through the axis of rotation of the regulating member.

FIGS. 1 and 2 show a control valve 10 which comprises a cylindrical body 12 limited by a bottom wall 14 and by a cylindrical side wall 16 with an axis XX. An axial orifice 18 delimited by a nozzle emerges into the bottom wall 14. Three side orifices 20, 22 and 24 delimited by three respective nozzles emerge into the cylindrical side wall 16. In the example, the axial orifice 18 forms a fluid inlet, while the three side orifices 20, 22 and 24 form outlets of the valve. It is therefore a four-way valve with one inlet way and three outlet ways.

In what follows, the orifices 18, 20, 22 and 24 and the corresponding nozzles will be identified by the same reference numbers each time.

The outlet nozzles 20, 22 and 24 emerge radially in the wall 16. The nozzles 20 and 24 are diametrically opposed, while the nozzle 22 forms a 90° angle relative to the common axis of the nozzles 20 and 24. In addition, the nozzles 20, 22 and 24 have successively decreasing diameters.

Housed inside the valve body 12 is a regulating member 26, also called a rotating member, that is made in the form of a generally cylindrical element and that is extended by a rod 28 directed along the axis XX. This rod 28 passes through a central opening that a circular-shaped cover 30 comprises. This cover 30 is screwed onto a collar 32 of the valve body by means of four fixing screws 34, with interposition of a seal (not shown). The regulating member 26 is rotated about the axis XX by an actuator 36 represented schematically in FIG. 1. It may be, for example, a gear motor consisting of an electric motor coupled to a reduction gear, whose position is controlled thanks to a copying of the position of a sensor, to bring the regulating member 26 into a multiplicity of different positions. As a variant, other types of actuators may be used, for example stepper motors or brushless motors.

In the example shown, the regulating member 26 is solid and comprises a truncated end 38 consisting of a flat face forming an angle close to 45° with the axis of rotation. The regulating member 26 makes it possible to control the fluid outlets 20, 22 and 24 with a law defined according to its angular position in the valve body.

However, the regulating member 26 is capable of many variant embodiments. In particular, it may be formed by a hollow body, and not by a solid body, and may not comprise a truncated face.

The regulating member 26 is surrounded, over a portion of its periphery, by a sealing segment 42 in the form of an open ring, fixedly attached in rotation to the regulating member, and capable of coming into sealed contact with the inner face of the side wall 16. The regulating member allows the sealing segment to be operated with a minimum of clearance and with a deflector function with regard to the fluid which passes through the valve. This makes it possible to divert the fluid toward at least one of the valve outlets with a minimum of pressure drop. This is particularly valuable for the diversion of the cooling fluid of an engine toward the branch that contains the cooling radiator of the engine.

Figure 3:
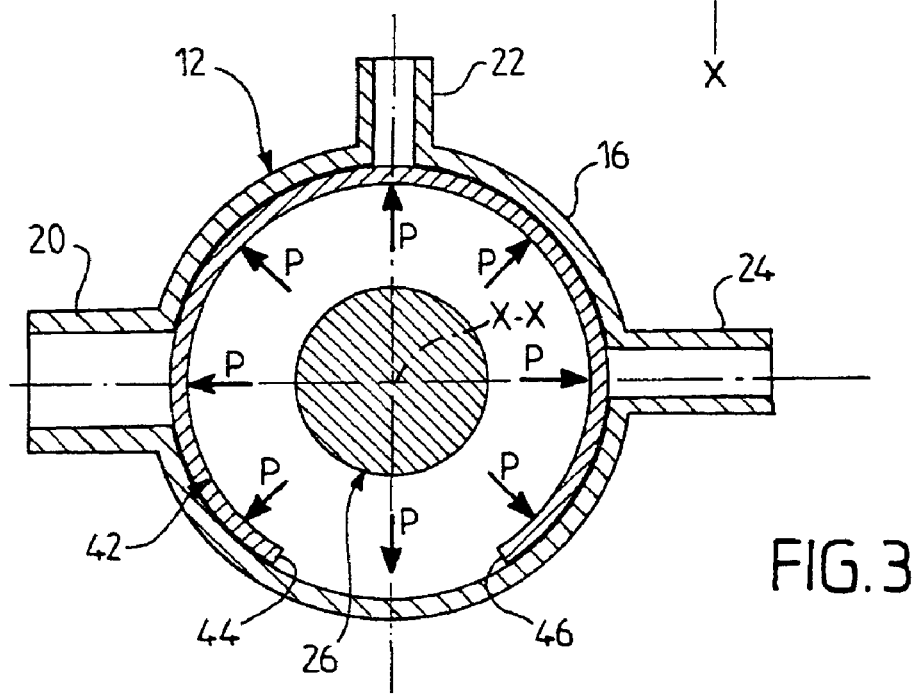
FIG. 3 is a view in cross section of the control valve of FIGS. 1 and 2.

As can be better seen in FIG. 3, the sealing segment 42 is arranged to be pressed radially against the side wall 16 in order to provide a seal as shown by the radial arrows P. Specifically, it is essential that this sealing segment can selectively, and in a sealed manner, block off the side orifices 20, 22 and 24 according to the angular position of the regulating member 26. The invention aims to procure a sealing segment that can ensure such a seal, irrespective of the difference of pressure and/or the flow of fluid present in the valve body, and in particular even when this difference of pressure and/or this flow reach very low, and even zero, values.

For this purpose, the invention proposes elastic means provided to hold apart, in any circumstance, the ends 44 and 46 of the sealing segment (FIG. 3) and deform it radially outward.

Figure 4:
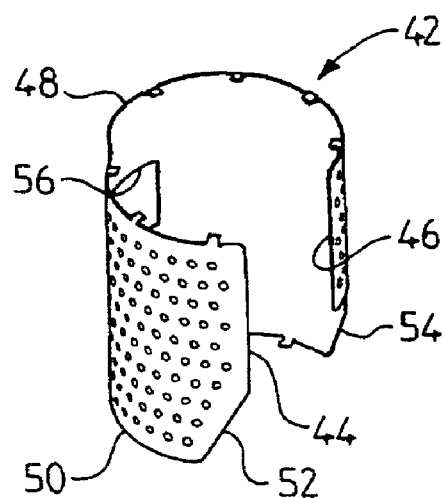
FIG. 4 is a view in perspective of a sealing segment designed to form part of a control valve according to the invention.

As can be seen in FIG. 4, the sealing segment 42, in the form of an open ring, has a generally cylindrical surface designed to be pressed tightly against the inside of the side wall of the valve body. The sealing segment 42 is limited in the upper portion by an edge 48 in the shape of an arc of a circle (here a stepped edge) and, in the bottom portion, by an edge 50 also in an arc of a circle. It is limited laterally by two edges 44 and 46, generally parallel with the axis XX, which form the two aforementioned ends. It also has two shaped edges 52 and 54 which connect the bottom edge 50 to the respective side edges 44 and 46. Finally, a window 56 is arranged in the sealing segment.

Figure 5:
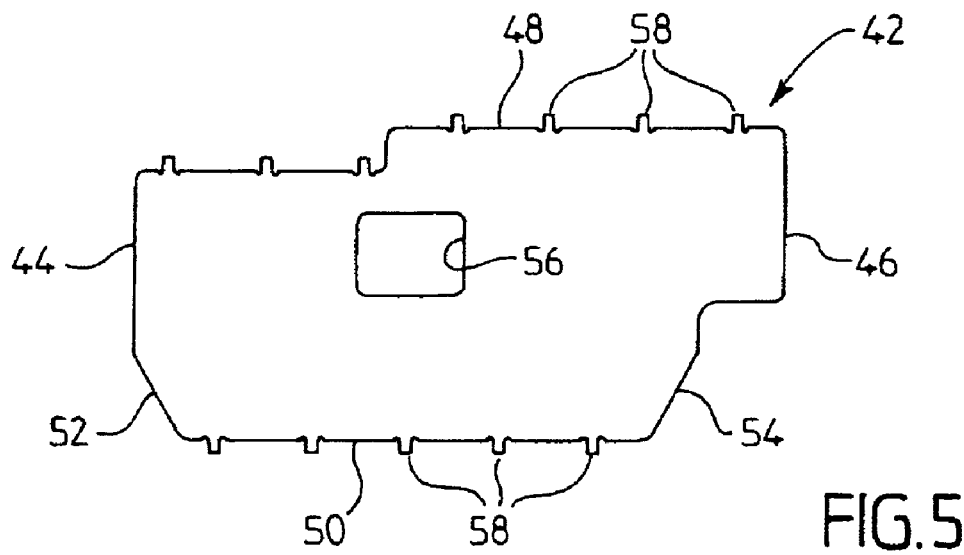
FIG. 5 represents the sealing segment of FIG. 4 in opened-out configuration.

The shape of the sealing segment, in the flat or opened-out configuration, is shown in FIG. 5. It can also be seen that the top edge 48 and bottom edge 50 are furnished with tabs 58 that can be folded to hold the sealing segment on the regulating member 26.

In one embodiment, the sealing segment 42 is made of a multilayer material. The segment is advantageously made of a metal sheet, for example a flat steel sheet (stainless or galvanized for protection against corrosion) or with a bronze base. This metal sheet is cut out, for example by stamping, to form the opened-out configuration of the sealing segment as shown in FIG. 5.

Figure 6:
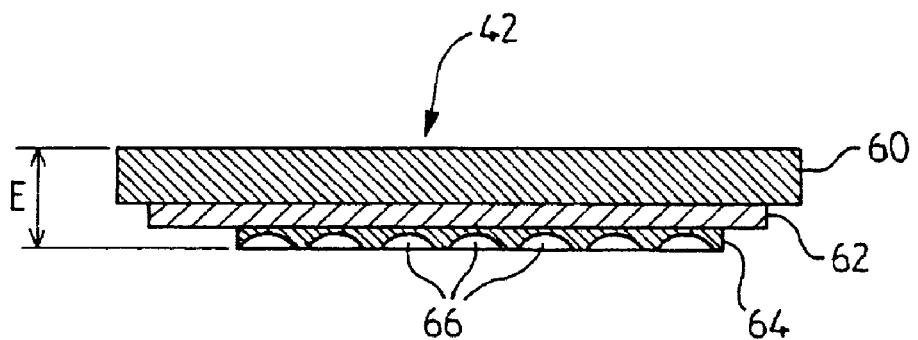
FIG. 6 is a view in section of the sealing segment showing the multilayer structure of the latter.

The metal sheet 60 (FIG. 6) is faced with a layer of sintering 62 advantageously formed of a metallic powder, for example bronze. This layer is used for keying to an outer facing 64 made of a low friction coefficient material which may be chosen in particular from the polyamides, the polyfluoroethylenes. In particular, a polyfluoroethylene and graphite-based material can be used.

It is advantageous that this facing comprises a smooth outer surface into which emerge a multiplicity of blind holes 66 each having, for example, the shape of a spherical cap, these holes being distributed evenly over the whole surface of the facing. These holes form a multitude of non-emerging tongue-and-groove joints which make it possible to reduce the friction surface and hence the friction torque between the sealing segment and the inner wall of the valve body. This also makes it possible to use an actuator 36 requiring less powerful motorization and hence less space. As an example, the total thickness E of the sealing segment (consisting of the three layers) may be of the order of 0.5 mm.

As previously indicated, the invention proposes elastic means for tending to permanently separate the end edges 44 and 46 of the segment.

Figure 7:
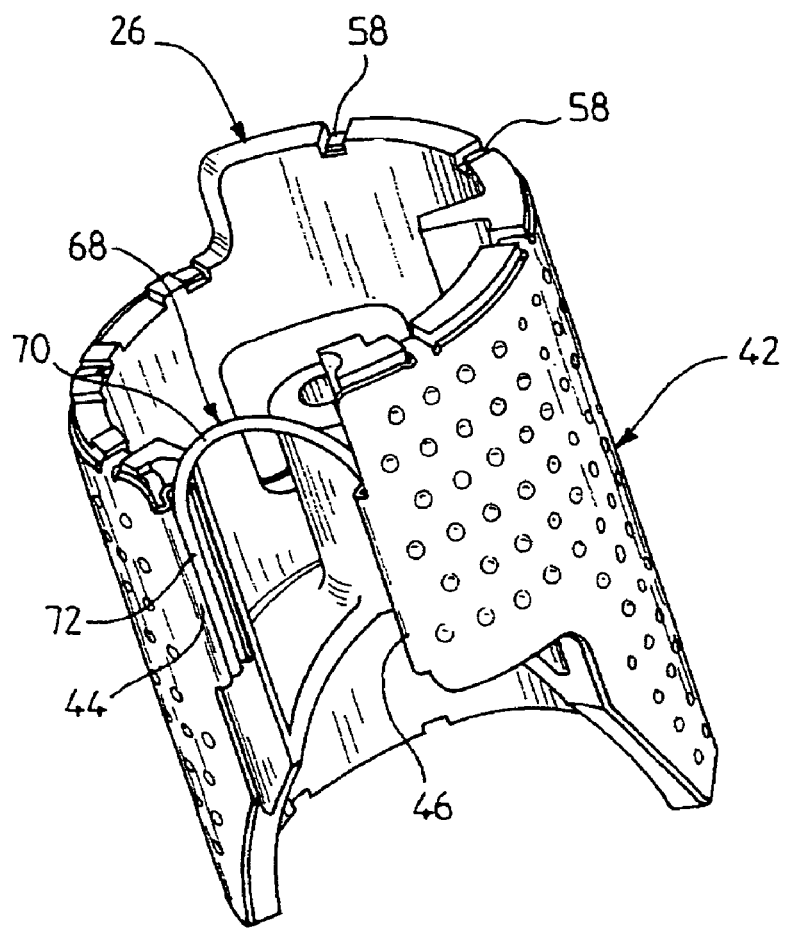
FIG. 7 is a view in perspective of a regulating member furnished with a sealing segment fitted with a U-shaped spring member.
Figure 8:
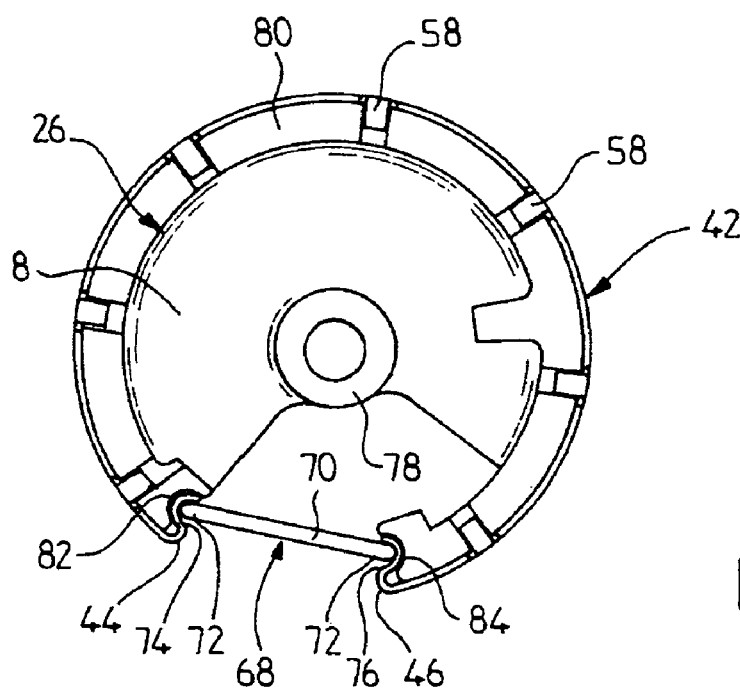
FIG. 8 is an end view corresponding to FIG. 7.

In the embodiment of FIGS. 7 and 8, to which reference is now made, a spring member 68 is interposed between the ends 44 and 46 of the sealing segment 42 to separate them from one another. The spring member 68 is a retaining ring formed of a spring-effect material, for example of spring-steel. Here it is made in the form of a wire comprising a U-shaped elbow 70 connecting two branches 72 which are pressed against the ends of the sealing segment.

The two ends 44 and 46 form two folded edges respectively delimiting two parallel grooves 74 and 76 facing one another to receive the two branches of the spring member. In the exemplary embodiment of FIGS. 7 and 8, the body of the regulating member 26 can be seen to be hollow. It comprises an axial barrel 78 connected to an envelope 80 of generally cylindrical shape via an intermediate part 8. This envelope 80 is interrupted and makes two grooves 82 and 84 in which the folded edges 44 and 46 of the sealing segment are received. It can also be seen that the tabs 58 of the segment are folded and pressed down against the envelope 80. This makes it possible to hold the sealing segment in place around the regulating member while allowing it a radial expansion to provide the seal.

Figure 9:
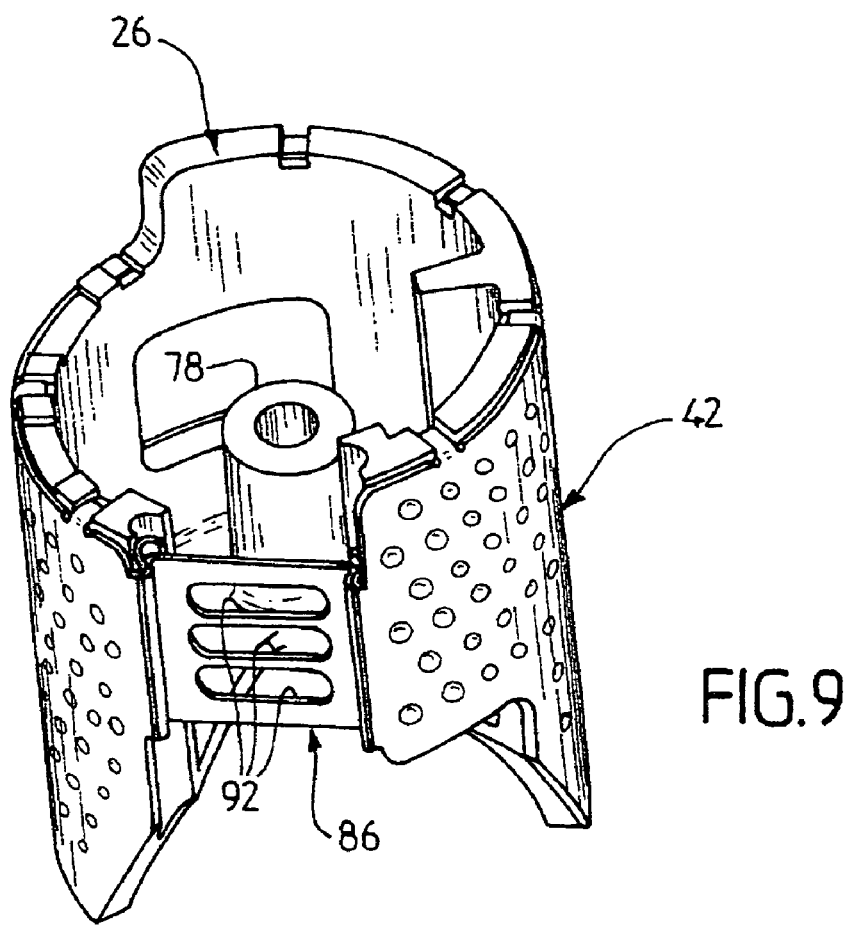
FIG. 9 is a view in perspective of a sealing segment furnished with a spring member made of metal sheet.
Figure 10:
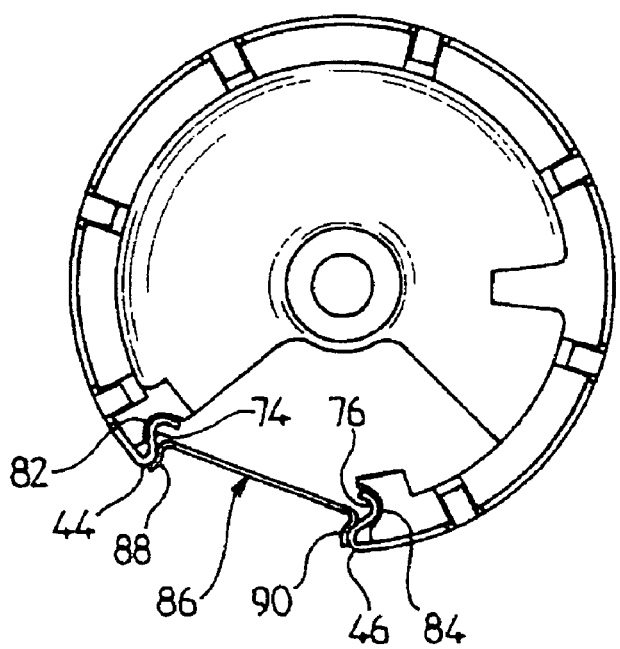
FIG. 10 is an end view corresponding to FIG. 9.

The embodiment of FIGS. 9 and 10 is similar to that of FIGS. 8 and 9. The spring member 86 here consists of a metal sheet having two opposite edges 88 and 90 arranged to be pressed against the ends of the sealing segment, that is to say in the respective grooves 74 and 76 similar to those previously shown. In the example, the spring member 86 comprises three cut-outs or internal windows 92 (FIG. 9) designed to provide a better elasticity.

Figure 11:
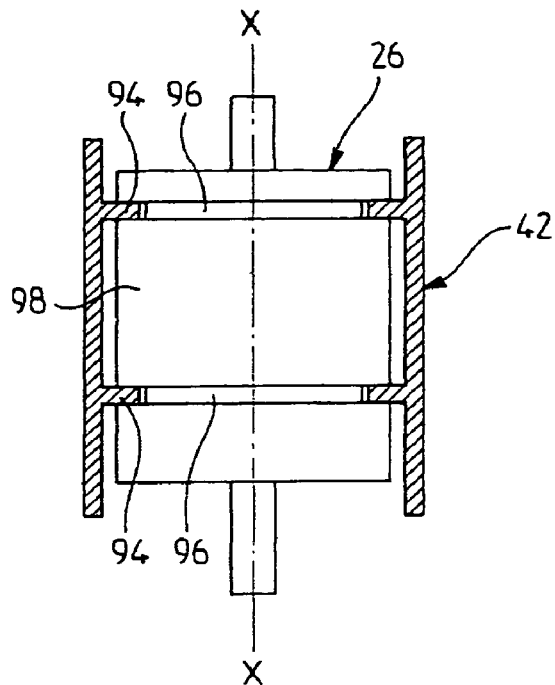
FIG. 11 is a schematic view of a regulating member furnished with a sealing segment whose radial expansion is provided by two radial expansion rings.

FIG. 11, which shows another embodiment in which the elastic means comprise two spring members 94 each made in the form of a radial expansion ring interposed between the regulating member 26 and the sealing segment 42. Each of the rings 94 consists of a retaining ring made of spring material that is inserted into a peripheral groove 96 arranged in a cylindrical wall 98 of the regulating member.

Figure 12:
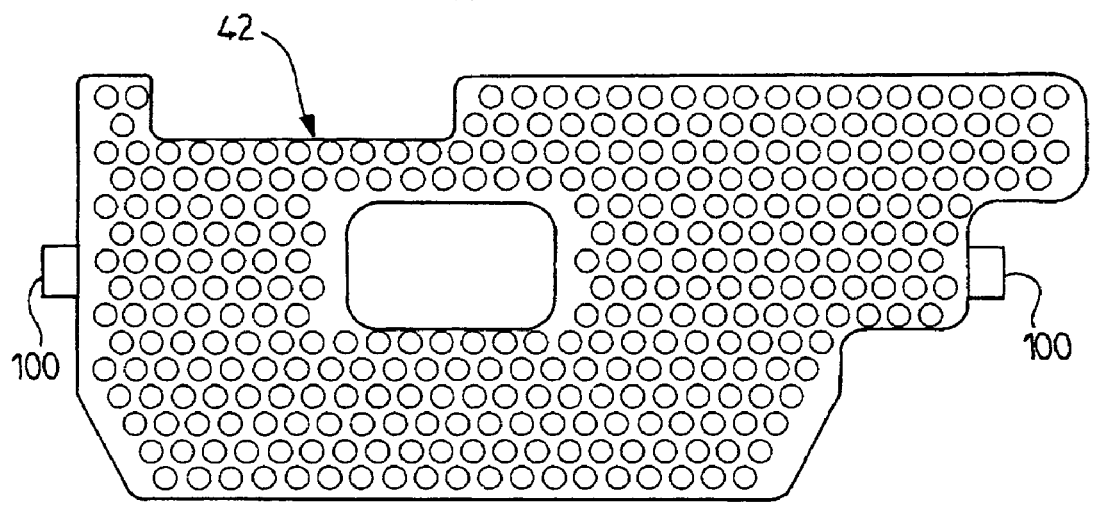
FIG. 12 is a view of a sealing segment, similar to that of FIG. 5, represented in opened-out configuration.
Figure 13:
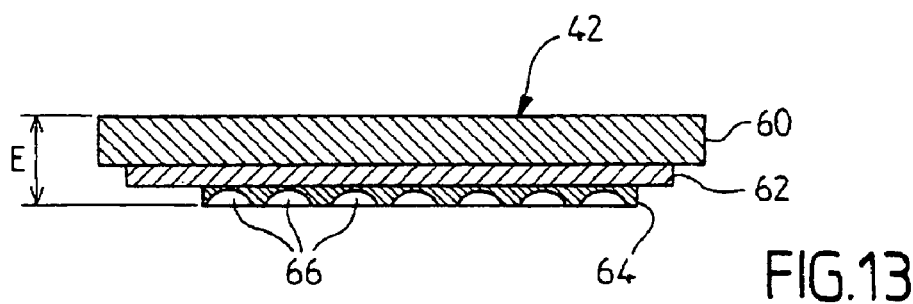
FIG. 13 is a view in section of the sealing segment of FIG. 12.

Reference is now made to FIGS. 12 and 13 which show respectively an opened-out view of another sealing segment 42 according to the invention and a sectional view of this segment. The general opened-out shape of the segment is similar to that of FIG. 5. It can be seen that it also comprises tabs 100 that can be folded to hold it, with the possibility of radial expansion, around the regulating member. In the section of FIG. 13, which is similar to that of FIG. 6, the same succession of layers is found. However, in this example, the thickness E is greater, for example of the order of 1 mm. Specifically, in this embodiment, the elastic means consist of a deformation of the sealing segment so that it has an external diameter D1 (FIG. 14) that is greater than the internal diameter D2 of the housing.

Figure 14:
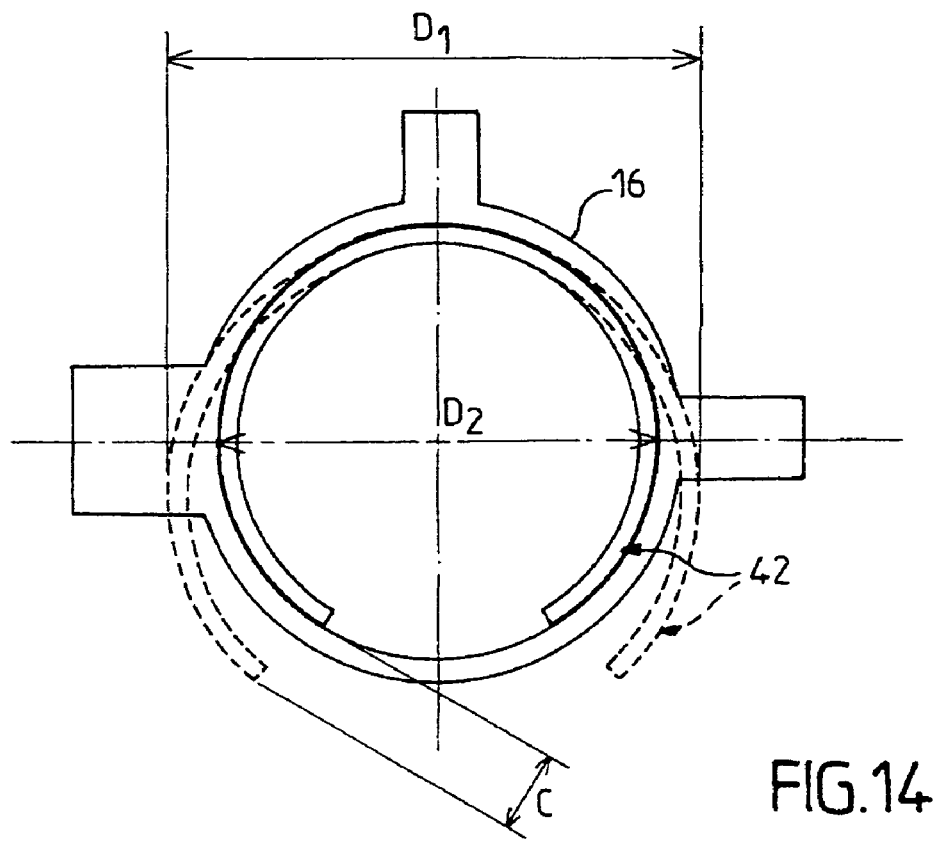
FIG. 14 is a view in cross section of a control valve furnished with a radial expansion sealing segment represented before and after mounting in the valve body.

The sealing segment 42 is formed by appropriate tools, for example with a rolling tool, so that it has an initial diameter D1 greater than the nominal diameter D2 of the bore or of the housing of the valve. The rolling of the material is carried out so that the facing 64 is situated toward the outside and can come to press against the internal bore of the valve body. This involves a pre-stressing of the sealing segment during its installation in the bore of the valve body. Once put in place, the sealing segment has an external diameter that matches the internal diameter of the bore of the valve body, as can be seen in FIG. 14.

Consequently the stiffness of the metal sheet (for example a steel sheet) of the segment is used to ensure a pressing of the segment, particularly at low pressure of the fluid. This is why, in this embodiment, the thickness of the metal sheet forming the facing must be greater than that of the facing used in the preceding embodiments. In FIG. 14, the travel C that results from installing the sealing segment under pressure in the valve body is also shown.

Instead of being made by rolling, the sealing segment could also, as a variant, be made by molding.

Figure 15:
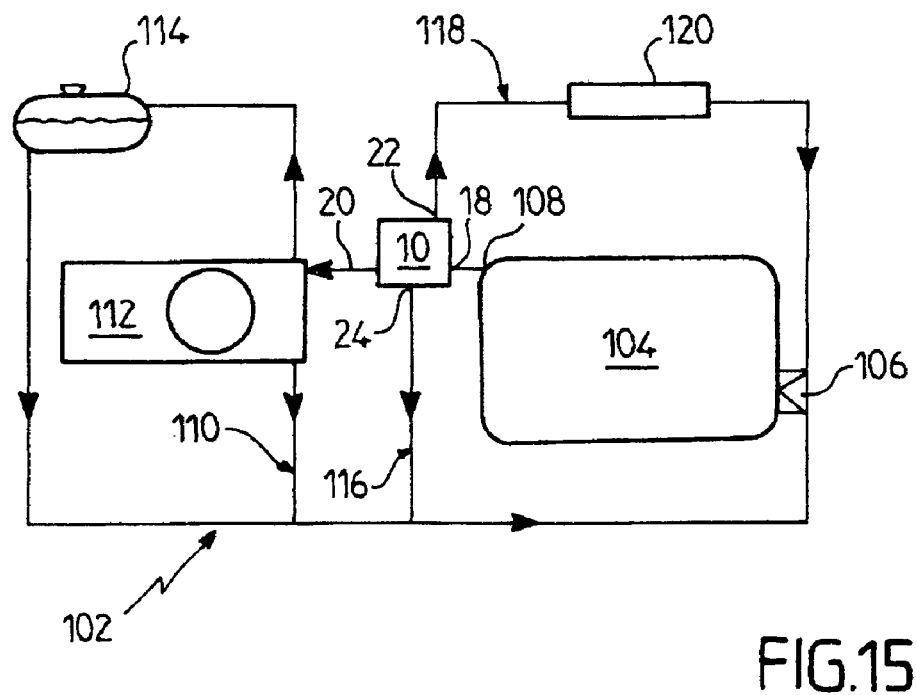
FIG. 15 is a diagram of a cooling circuit of a motor vehicle internal combustion engine incorporating a control valve according to the invention.

Reference is now made to FIG. 15 which illustrates a circuit 102 for the cooling of an internal combustion engine 104 of a motor vehicle. The circuit 102 is traversed by a cooling fluid, usually water with added antifreeze, which circulates under the action of a pump 106. The fluid heated by the engine leaves the latter via an outlet 108 that is connected to the nozzle 18 of a control valve 10 of the type previously described.

This valve also comprises three outlet nozzles 20, 22 and 24 that are connected to three branches of the circuit. The nozzle 20 is connected to a first branch 110 which contains a cooling radiator 112 of the engine and an expansion vessel 114. The nozzle 24 is connected to a second branch 116 which forms a bypass of the cooling radiator 112. Finally, the outlet nozzle 22 is connected to a third branch 118 which contains an air heater 120 used to heat the passenger compartment of the vehicle.

The valve 10 thus makes it possible to independently manage the flows of fluid in the three branches 110, 116 and 118 in order to optimize the internal combustion engine temperature and the heating of the passenger compartment.

Naturally, the invention is not limited to the embodiments previously described and applies to other variants, particularly as concerns the nature of the elastic means making it possible to press the sealing segment against the side wall of the valve body. It is also possible to arrange a clearance between the regulating member and the sealing segment. Nor is the invention limited to the application to a cooling circuit of an internal combustion engine.

In addition, the axial orifice of the valve does not necessarily form an inlet orifice and may also, as a variant, form an outlet orifice. As a corollary, the side orifices may also form inlet orifices, and not outlet orifices for the fluid.

The invention claimed is:

1. A control valve for a fluid circulation circuit, comprising a valve body (12), said valve body delimiting a housing of revolution for a regulating member (26) capable of rotating about a rotation axis (XX) and of taking various angular positions to control the distribution of the fluid through a plurality of orifices, and in which the regulating member (26) is surrounded by a sealing segment (42) in the shape of an open ring, that is fixedly attached in rotation to the regulating member (26), characterized in that elastic means (68; 86) are provided to separate two ends (44, 46) of the sealing segment (42) in order to deform it radially outward and ensure that the sealing segment (42) is pressed against the valve body housing;
wherein the elastic means (68; 86) comprises at least one spring member interposed between the ends (44, 46) of the sealing segment (42) to separate the ends (44, 46) from one another, the ends (44, 46) of the sealing segment (42) having two folded edges delimiting two parallel grooves (74, 76) facing one another for receipt of the spring member.

2. The control valve as claimed in claim 1, wherein the spring member is a retaining ring (68) formed of a spring-effect material.

3. The control valve as claimed in claim 2, wherein the retaining ring (68) comprises a U-shaped elbow (70) connecting two branches (72) arranged to be pressed against the ends (44, 46) of the sealing segment (42).

4. The control valve as claimed in claim 1, wherein the spring member is a metal sheet (86) having two opposite sides (88, 90) arranged to be pressed against the ends (44, 46) of the sealing segment (42).

5. The control valve as claimed in claim 1, wherein the elastic means comprises a deformation of the sealing segment (42) so that the sealing segment has an external diameter (D1) that is greater than the internal diameter (D2) of the housing to allow the sealing segment to be mounted under pre-stress in the housing.

6. The control valve as claimed in one of claims 2-4, and 5, wherein the sealing segment (42) is made of a spring-effect material.

7. The control valve as claimed in claim 6, wherein the spring-effect material is spring steel.

8. The control valve as claimed in claim 6, wherein the sealing segment (42) is furnished externally with a facing (64) made of a low friction coefficient material.

9. The control valve as claimed in claim 8, wherein the low friction coefficient material is chosen from the polyamides and polyfluoroethylene.

10. The control valve as claimed in claim 8, wherein the sealing segment (42) is furnished with a key coat (62) to make keying of the facing (64) easier.

11. The control valve as claimed in one of claims 2-4, and 5, wherein the sealing segment (42) comprises a smooth outer surface into which a multiplicity of evenly distributed blind holes (66) emerges, which makes it possible to reduce the contact surface between the sealing segment (42) and a side wall (16) of the valve body (12).

12. The control valve as claimed in one of claims 2-4, and 5, wherein said valve body (12) comprises a bottom wall (14) into which an axial orifice (18) emerges and a side wall (16) into which at least two side orifices (20, 22, 24) emerge, the axial orifice (18) forming a fluid inlet, while the side orifices (20, 22, 24) form fluid outlets.

13. A fluid circulation circuit, characterized in that the fluid circulation circuit comprises a control valve as claimed in claim 12, whose axial orifice (18) is connected to a source of fluid (108) and whose side orifices (20, 22, 24) are connected respectively to branches (110, 118, 116) of the circuit.

14. The fluid circulation circuit as claimed in claim 13, wherein the fluid circulation circuit is made in the form of a cooling circuit (102) of a motor vehicle internal combustion engine (104) that is traversed by a cooling fluid under the action of a circulation pump (106), and in that the control valve (10) is a three-way valve whose axial orifice (18) is connected to an intake (108) of cooling fluid originating from the engine, and whose three side orifices (20, 24, 22) are connected respectively to a first branch (110) which contains a cooling radiator (112) of the engine, a second branch (116) that forms a bypass of the cooling radiator and a third branch (118) that contains an air heater (120) for the heating of a passenger compartment.

15. The control valve as claimed in claim 1, wherein the regulating member (26) includes a hollow body having disposed herein an axial barrel (78) connected to an envelope (80) via an intermediate part (8), and wherein the envelope (80) is interrupted to make two other grooves (82, 84) within which respective folded edges (44, 46) of the sealing segment are received.

* * * * *

UNITED STATES PATENT AND TRADEMARK OFFICE
CERTIFICATE OF CORRECTION

PATENT NO. : 8,393,305 B2
APPLICATION NO. : 11/596950
DATED : March 12, 2013
INVENTOR(S) : Alain Farkh et al.

Page 1 of 1

It is certified that error appears in the above-identified patent and that said Letters Patent is hereby corrected as shown below:

IN THE CLAIMS:

Column 7, line 45, please delete "2-4 and 5" before "wherein" and replace with -- 1-5 --

Column 8, line 10, please delete "2-4 and 5" before "wherein" and replace with -- 1-5 --

Column 8, line 16, please delete "2-4 and 5" before "wherein" and replace with -- 1-5 --

Signed and Sealed this
Twenty-fourth Day of June, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,393,305 B2 | Page 1 of 1 |
| APPLICATION NO. | : 11/596950 | |
| DATED | : March 12, 2013 | |
| INVENTOR(S) | : Farkh et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1881 days.

Signed and Sealed this
Sixteenth Day of December, 2014

Michelle K. Lee
*Deputy Director of the United States Patent and Trademark Office*